US008522253B1

(12) United States Patent
Rozas et al.

(10) Patent No.: US 8,522,253 B1
(45) Date of Patent: Aug. 27, 2013

(54) HARDWARE SUPPORT FOR VIRTUAL MACHINE AND OPERATING SYSTEM CONTEXT SWITCHING IN TRANSLATION LOOKASIDE BUFFERS AND VIRTUALLY TAGGED CACHES

(76) Inventors: Guillermo Rozas, Los Gatos, CA (US); Alex Klaiber, Mountain View, CA (US)

( * ) Notice: Subject to any disclaimer, the term of this patent is extended or adjusted under 35 U.S.C. 154(b) by 1410 days.

(21) Appl. No.: 11/394,521

(22) Filed: Mar. 31, 2006

Related U.S. Application Data

(63) Continuation-in-part of application No. 11/096,922, filed on Mar. 31, 2005, now Pat. No. 7,734,892.

(51) Int. Cl.
*G06F 9/46* (2006.01)
*G06F 9/26* (2006.01)

(52) U.S. Cl.
USPC ............................. 718/108; 718/104; 711/205

(58) Field of Classification Search
None
See application file for complete search history.

(56) References Cited

U.S. PATENT DOCUMENTS

| | | | |
|---|---|---|---|
| 4,075,704 A | 2/1978 | O'Leary | |
| 4,245,344 A | 1/1981 | Richter | |
| 4,356,550 A | 10/1982 | Katzman et al. | |
| 4,414,624 A | 11/1983 | Summer, Jr. et al. | |
| 4,524,415 A | 6/1985 | Mills, Jr. et al. | |
| 4,527,237 A | 7/1985 | Frieder et al. | |
| 4,577,273 A | 3/1986 | Hoppert et al. | |
| 4,597,061 A | 6/1986 | Cline et al. | |
| 4,600,986 A | 7/1986 | Scheuneman et al. | |
| 4,633,434 A | 12/1986 | Scheuneman | |
| 4,682,281 A | 7/1987 | Woffinden et al. | |
| 4,816,991 A | 3/1989 | Watanabe et al. | |
| 4,920,477 A | 4/1990 | Colwell et al. | |
| 5,294,897 A | 3/1994 | Notani et al. | |
| 5,317,705 A | 5/1994 | Gannon et al. | |
| 5,317,754 A | 5/1994 | Blandy et al. | |
| 5,574,878 A | 11/1996 | Onodera et al. | |
| 5,754,818 A * | 5/1998 | Mohamed | 711/207 |
| 5,872,985 A * | 2/1999 | Kimura | 710/1 |
| 6,075,938 A | 6/2000 | Bugnion et al. | |
| 6,167,490 A | 12/2000 | Levy et al. | |
| 6,260,131 B1 | 7/2001 | Kikuta et al. | |
| 6,604,187 B1 | 8/2003 | McGrath et al. | |
| 6,907,600 B2 | 6/2005 | Neiger et al. | |
| 7,111,145 B1 | 9/2006 | Chen et al. | |
| 7,278,030 B1 | 10/2007 | Chen et al. | |
| 2004/0064668 A1 | 4/2004 | Kjos et al. | |
| 2004/0117593 A1 | 6/2004 | Uhlig et al. | |

OTHER PUBLICATIONS

Barham et al., "Xen and the Art of Virtualization," ACM Symposium on Operating Systems Principles, Oct. 19, 2003, pp. 164-177.

* cited by examiner

*Primary Examiner* — Camquy Truong

(57) ABSTRACT

A method for tagging cache entries to support context switching for virtual machines and for operating systems. The method includes, storing a plurality of entries within a cache of a CPU of a computer system, wherein each of the entries includes a context ID, handling a first portion of the entries as local entries when the respective context IDs indicate a local status, and handling a second portion of the entries as global entries when the respective context IDs indicate a global status.

13 Claims, 8 Drawing Sheets

HARDWARE SUPPORT FOR VIRTUAL MACHINE AND OPERATING SYSTEM CONTEXT SWITCHING IN TRANSLATION LOOKASIDE BUFFERS AND VIRTUALLY TAGGED CACHES

This application is a Continuation in Part of U.S. application Ser. No. 11/096,922, now U.S. Pat. No. 7,734,892, filed on Mar. 31, 2005, to Rozas et al., entitled "MEMORY PROTECTION AND ADDRESS TRANSLATION HARDWARE SUPPORT FOR VIRTUAL MACHINES" which is incorporated herein in its entirety.

TECHNICAL FIELD

The present invention relates generally to digital computer systems. More specifically, the present invention pertains to efficiently implementing hardware support for virtual machine and operating system context switching in TLBs (translation lookaside buffers) and virtually tagged caches.

BACKGROUND ART

With both TLBs and virtually tagged caches, lookups are based on virtual addresses. Both operating systems and virtual machines are configured to perform context switches or world switches. Context switching is a term associated with operating systems, whereas world switching is a term associated with virtual machines. In general, a context switch is the process of storing and restoring the state of a CPU (e.g., a context) such that multiple processes can share a single CPU resource. World switching is the process of switching between two or more worlds of a virtual machine architecture, typically between the host world and/or the virtual machine monitor (e.g., often refer to as the VMM or hypervisor) to and from the virtual world/virtual machine. As with context switching, when a "world switch" is performed, all user and system CPU state needs to be saved and restored. With respect to TLBs and virtually tagged caches, with both context switching and world switching, the computer system needs to flush or tag the TLB/cache. In each case, what is required is a solution for efficiently supporting global pages, both operating system global pages and virtual machine global pages.

DISCLOSURE OF THE INVENTION

Embodiments of the present invention provide a method and system for implementing hardware support for virtual machine and operating system context switching in translation lookaside buffers and virtually tagged caches.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
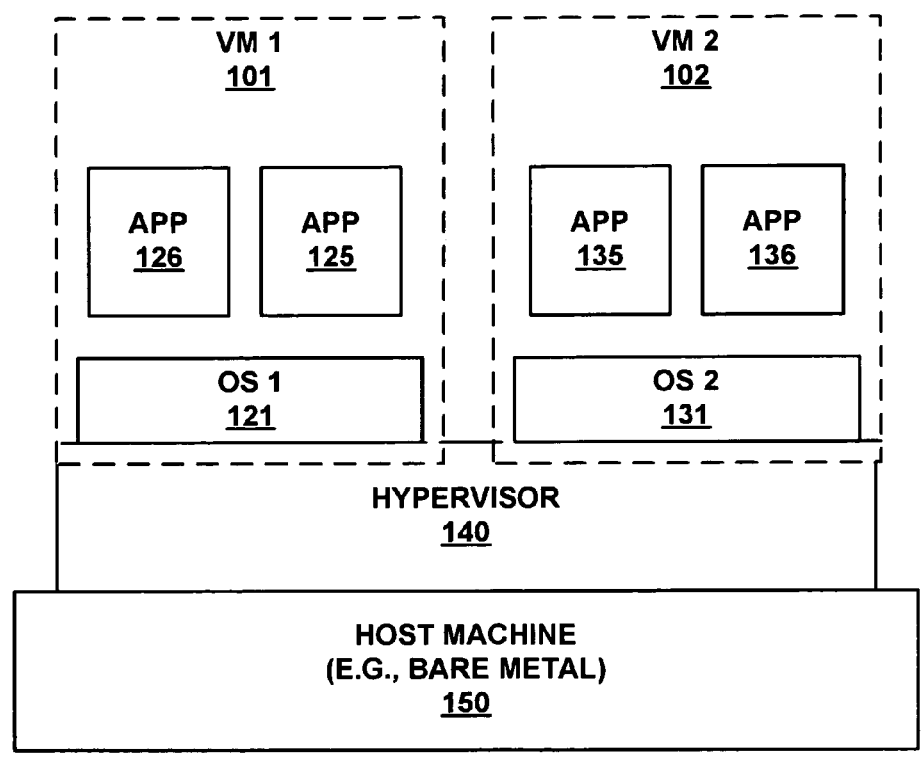
FIG. 1 shows a diagram of a computer system configured for supporting multiple virtual machines and virtual machine applications in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for providing hardware support for virtual machine and operating system context switching in translation lookaside buffers and virtually tagged caches. For example, in one embodiment, the present invention is implemented as a process for providing hardware support for memory protection and virtual memory address translation for a virtual machine is implemented by executing a host machine application on a host computer system, executing a first operating system within a first virtual machine, and executing a second operating system within a second virtual machine. The first and second operating systems support a respective plurality of applications, each having different contexts. A plurality of TLB or cache entries for the first virtual machine application (e.g. the first operating system) and the second virtual machine application (e.g., the second operating system) within a common TLB or cache of the host computer system.

The TLB or cache entries each include respective context identifiers and optionally includes respective global indicators that enable a unique identification of each the entries. This unique identification prevents virtual address aliasing problems between the applications of the different operating systems of the different virtual machines, and prevents unnecessary flushes of the TLB or cache entries. Embodiments of the present invention and their benefits are further described below.

Notation and Nomenclature

Some portions of the detailed descriptions which follow are presented in terms of procedures, steps, logic blocks, processes, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., system 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

FIG. 1 shows a diagram depicting an architecture of a computer system 100 in accordance with one embodiment of the present invention. As depicted in FIG. 1, the computer system 100 includes a first virtual machine 101 and a second virtual machine 102. The first and second virtual machines 101-102 each execute on a host machine application, referred to as a hypervisor 140, which itself executes directly on the host computer system 150, often referred to as the "bare metal" machine.

It should be noted embodiments of the present invention are also applicable non-virtual machine related architectures. For example, embodiments of the present invention can also be applied to a single operating system (e.g., operating system 131) switching contexts between two or more applications (e.g., applications 135-136). The single operating system would execute directly on the host machine 150 (e.g., without the hypervisor 140) and would not reside within a virtual machine (e.g., not within the virtual machine 102).

The computer system 100 embodiment of FIG. 1, diagrams a process for providing hardware support for memory protection and virtual memory address translation for a plurality of virtual machines, in this case, virtual machines 101 and 102. The virtual machines 101-102 execute on top of the host machine application 140, or the "hypervisor". The hypervisor 140 functions as a virtualization layer, or software-based hardware abstraction layer that controls physical resources and firmware resources (e.g., BIOS) of the real computer system hardware (e.g., motherboard, IO devices, peripherals, etc.). Only the hypervisor 140 is exposed to the "bare machine interface" of the computer system 100 (e.g., host machine 150). Thus, only the hypervisor 140 comprises the true "kernel" having final control of the host machine 150.

Alternatively, in one embodiment, the hypervisor 140 can be implemented as an application that itself runs on top of a host operating system and uses the host operating system (e.g., and its kernel) to interface with the host machine 150.

The hypervisor presents programs executing within the virtual machines 101-102 with the illusion that they are in fact executing upon a real physical computer system (e.g., bare metal). The programs executing within the virtual machines 101-102 can be themselves operating systems which further support other application programs, such as the operating systems 121 and 131 and the application programs 125-126 and 135-136. In general, all of these programs need to be provided, or otherwise negotiate, the consent of the hypervisor 140 in order to access the functionality of the host machine 150 to perform, for example, user IO, and the like.

The computer system embodiment 100 shows a special case where the virtual machines 101-102 each execute their own respective operating systems 121 and 131. As described above, the hypervisor presents programs executing within the virtual machines 101-102 with the illusion that they are in fact executing upon a real physical computer system. Accordingly, the operating systems 121 and 131 will function most efficiently when provided support for their own respective virtual memory management systems. These systems assume the presence of a dedicated host machine TLB and cache. Embodiments of the present invention function in part by reducing the expense of flashing the TLB/cache on world switches (e.g., between virtual machines) and context switches (e.g., between applications on an OS).

Figure 2:
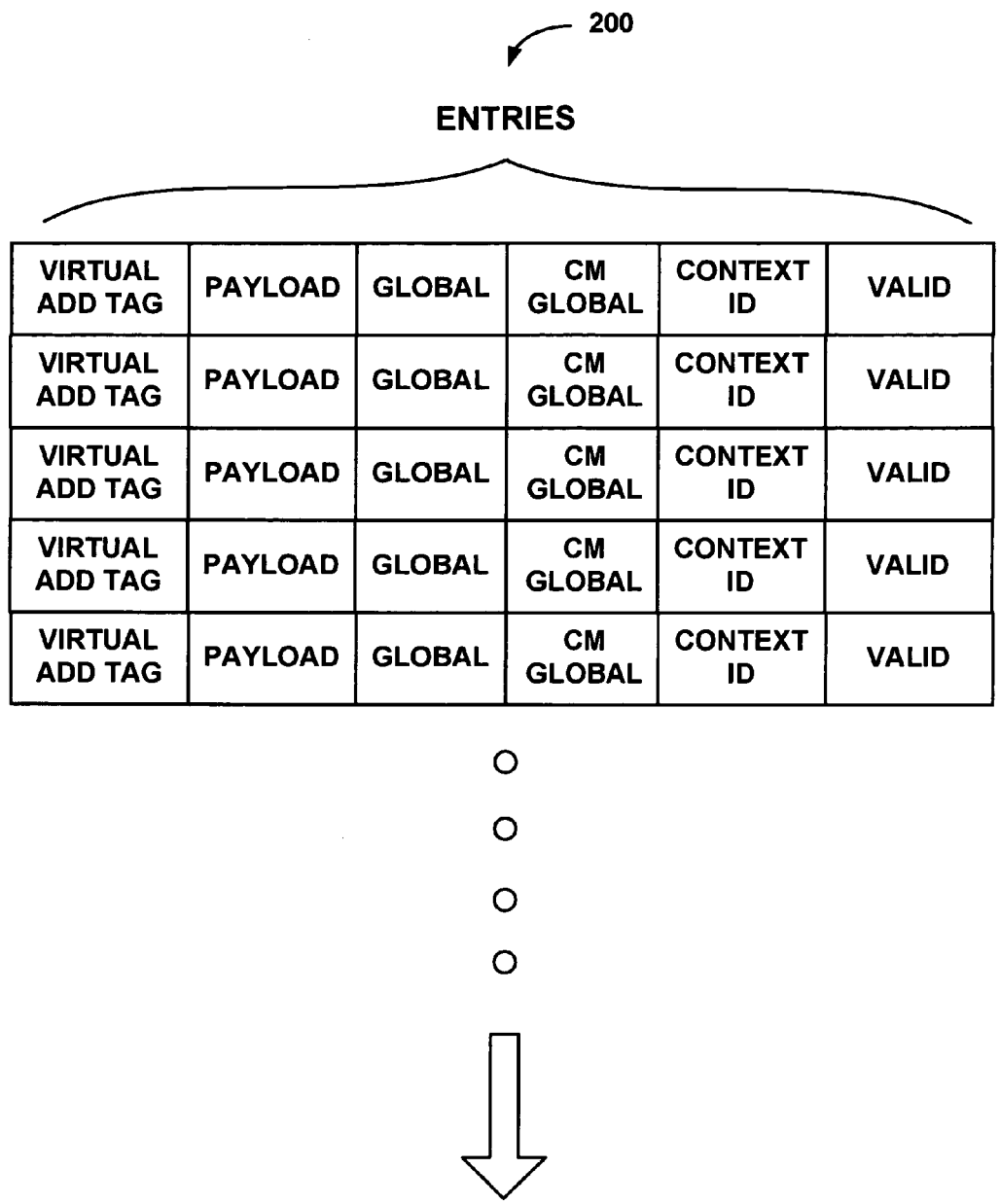
FIG. 2 shows a diagram of a plurality of entries of a TLB (translation lookaside buffer) in accordance with one embodiment of the present invention.

FIG. 2 shows a diagram of a plurality of entries 200 of a TLB or cache in accordance with one embodiment of the present invention. As depicted in FIG. 2, the entries 200 show the typical entries that are cached within the CPU of the host machine 150. Each of the entries comprise a virtual address tag, a payload, an optional global indicator, a context identifier, and a validity indicator, as shown. An optional cross-machine global indicator can also be included as shown.

In accordance with embodiments of the present invention, the entries 200 are "tagged" such that the TLB/cache of the host machine 150 can include entries for different applications executing within different contexts. In the FIG. 2 embodiment, the entries 200 are tagged with respect to their context ID so that upon a switch from one context to another, the TLB/cache does not have to be completely invalidated (e.g., flushed). In this manner, the context ID allows entries from different applications (e.g., applications 125-126) to coexist. Thus, for a valid entry match, each TLB/cache lookup must match not only the virtual address and valid bits, but also match the context-ID, in order to be successful.

In addition to using context identifiers, the entries 200 optionally have global indicators indicating those entries which are valid for all processes, or contexts. In one embodiment, the global indicator comprises a bit (e.g., G-bit) in each entry, and specifies that a particular entry matches all contexts.

In one embodiment, in addition to the global indicator, the cross-machine global indicator (e.g., CM global) is also used to further identify those entries belonging to the processes of the various virtual machine. For example, the cross-machine global indicator can be implemented as a single bit (e.g., a universal bit) signifying the particular entry is valid for all processes and all contexts of all virtual machines.

Figure 3:
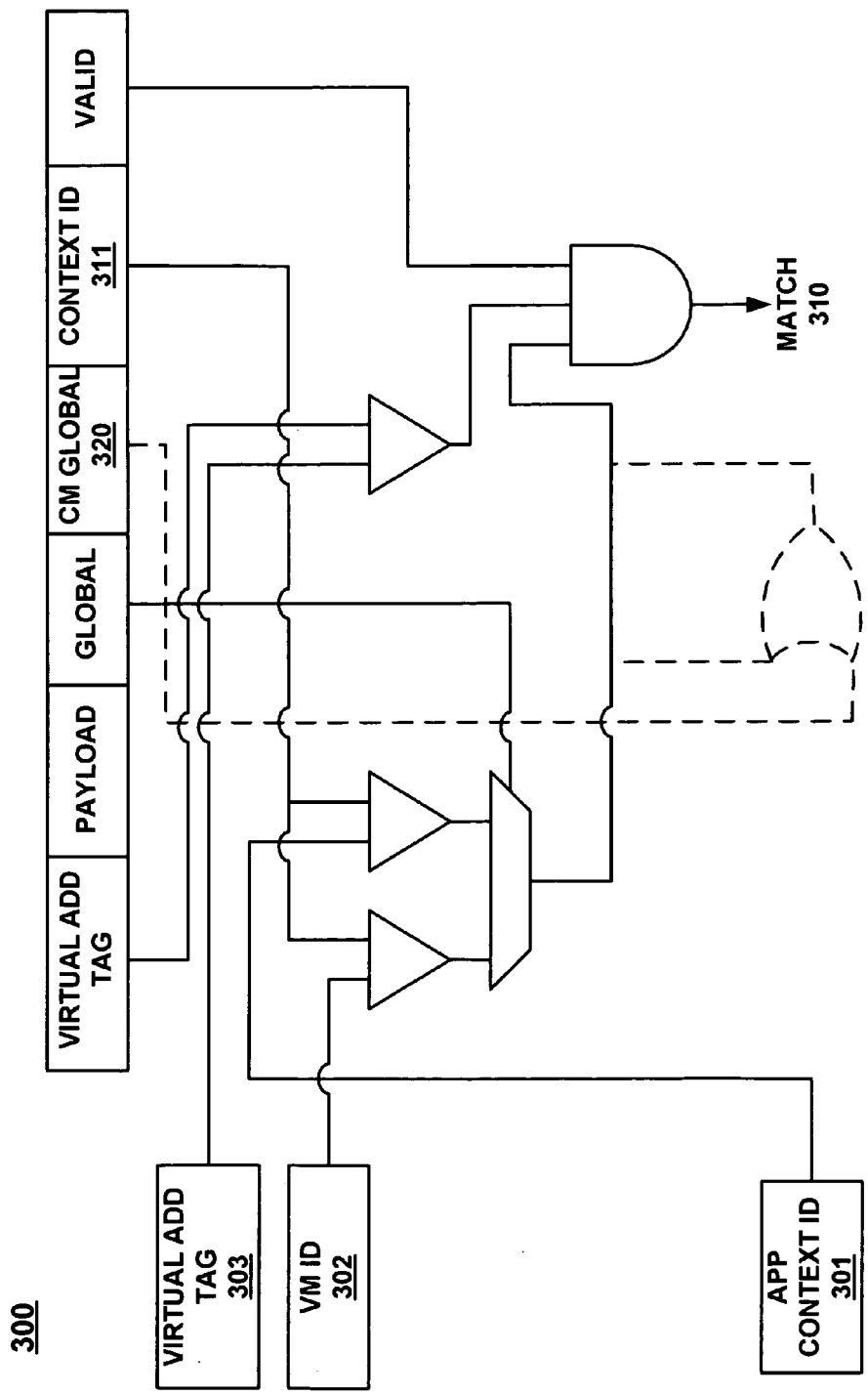
FIG. 3 shows a diagram depicting TLB or cache matching hardware in accordance with one embodiment of the present invention.

FIG. 3 shows a diagram depicting TLB/cache matching hardware 300 in accordance with one embodiment of the present invention. As depicted in FIG. 3, the matching hardware 300 shows the logical operation of match detection when matching virtual addresses with physical addresses from different virtual machines executing on a common host machine, or alternatively, from different applications executing on a common operating system.

As described above, the hypervisor 140 presents programs executing within the virtual machines 101-102 with the illusion that they are in fact executing upon a real physical computer system. Note that each of these machine images (e.g., virtual machine 101 and virtual machine 102) will have its own global pages and process contexts, and what was previously a global page identifier is no longer global in that it is no longer common to all processes/address spaces respect to the host machine 150, but only to the subset running on the same (virtual) machine image.

Embodiments of the present invention allows a single bit of global-page indicator to be multiplexed along multiple machine images, or virtual machines, so that each machine image has its own set of 'global' pages with hardware support for fast context switching. In the FIG. 3 embodiment, the TLB or cache entries and page table entries each comprise a virtual address tag, a payload, a global indicator, a context identifier, and a validity indicator, as shown in FIG. 2 and FIG. 3, and the global indicator comprises a global bit. The context ID field may be in both TLB or cache entries and page table entries (e.g., if architecturally visible), or only in TLB or cache entries (e.g., if only visible micro-architecturally). In the present embodiment, the context-ID register is extended to have two fields, namely the per-process context-ID field (e.g., App Context ID 301), and the machine-instantiation/virtual machine context-ID field (e.g., VM ID 302). The virtual address tag 303 functions conventionally.

As the logic depicted in FIG. 3 shows, a match 310 occurs only when the virtual address tags match and the TLB or cache entry is valid. If the TLB or cache entry has the global bit clear (e.g., marked not global), the entry's context-ID field must match the per-process application context-ID field 301 of the context-ID register. If the TLB or cache entry has the global bit set (e.g., marked global), the entry's context-ID field 311 must match the machine-instantiation virtual machine ID field 302. On a context switch within the same virtual machine (e.g., virtual machine 101 or virtual machine 102), only the per-process context-ID field 301 is changed. On a "virtual machine switch", both the per-process fields 301 and machine-instantiation context-ID fields 302 are switched. In one embodiment, each machine instantiation (e.g., the host machine 150 or virtual machine 101-102) has its own machine-instantiation field which is in effect when that machine is active. In so doing, embodiments of the present invention can nest virtual machines recursively (e.g., virtual machines on virtual machines on virtual machines, and so on) on a physical host machine.

It should be noted that the virtualization layer (e.g., hypervisor 140) manages the machine-instantiation IDs and can invalidate (e.g., flush) the relevant parts of the hardware TLB as necessary when re-using a machine-instantiation field.

It should be noted that the context ID field 311 of a TLB or cache entry is filled when the entry is inserted into the TLB or cache. The process of filling the context ID field is substantially similar to the comparison performed when checking for validity. For example, if the TLB or cache entry being inserted is global, the VM ID field (e.g., VM ID 302) of the context-id register is inserted into the context-ID field of the entry. If the TLB or cache entry being inserted is not global, the context-ID field of the context-ID register is inserted into the context-ID field of the entry.

As described above, in one embodiment, TLB or cache entries can be marked as global across multiple virtual machines. In such an embodiment, an additional indicator/bit can be incorporated (e.g., the cross-machine global indicator, or CM global) that would mark a TLB or cache entry as being global across multiple virtual machines. For example, such a cross-machine global indicator can be used to mark one or more TLB or cache entries as belonging to, or related to, interaction with the virtualization layer/hypervisor (e.g., hypervisor 140). The logic depicted in FIG. 3 can be modified to incorporate the CM global ID 320 as shown by the dotted lines. Fast hardware based context switching support would thus be provided to all virtual machines needing access to the global multi-machine entries. In this manner, the global indicator can mark one or more TLB or cache entries as global within one virtual machine, and the cross machine global indicator can mark one or more entries as global across all virtual machines.

Figure 4:
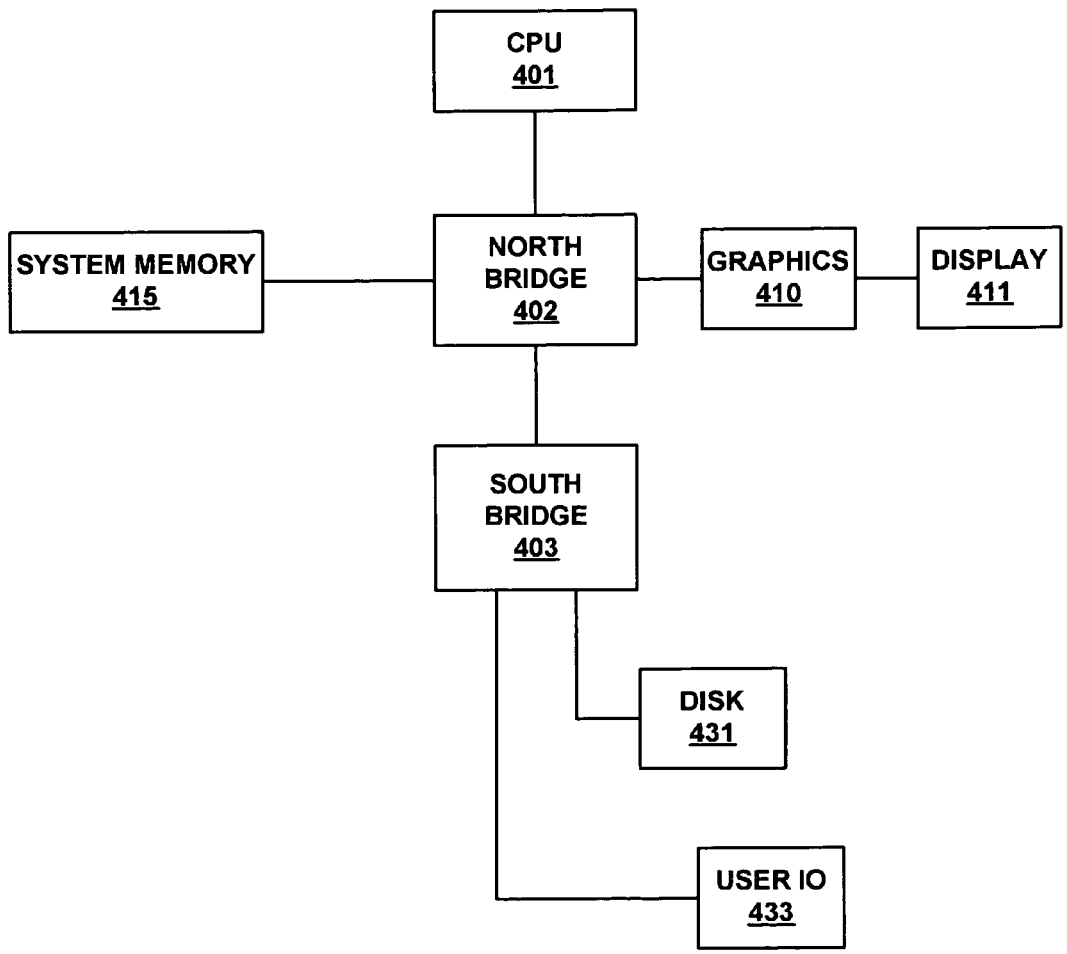
FIG. 4 shows a diagram of a computer system platform in accordance with one embodiment of the present invention.

With reference now to FIG. 4, a computer system 400 in accordance with one embodiment of the present invention is shown. Computer system 400 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 400) and are executed by the CPU 401 of system 400. When executed, the instructions cause the system 400 to implement the functionality of the present invention as described above.

In general, system 400 comprises at least one CPU 401 coupled to a North bridge 402 and a South bridge 403. The North bridge 402 provides access to system memory 415 and a graphics unit 410 that drives a display 411. The South bridge 403 provides access to a coupled disk drive 431 and various user I/O devices 433 (e.g., keyboard, mouse, etc.) as shown.

Figure 5:
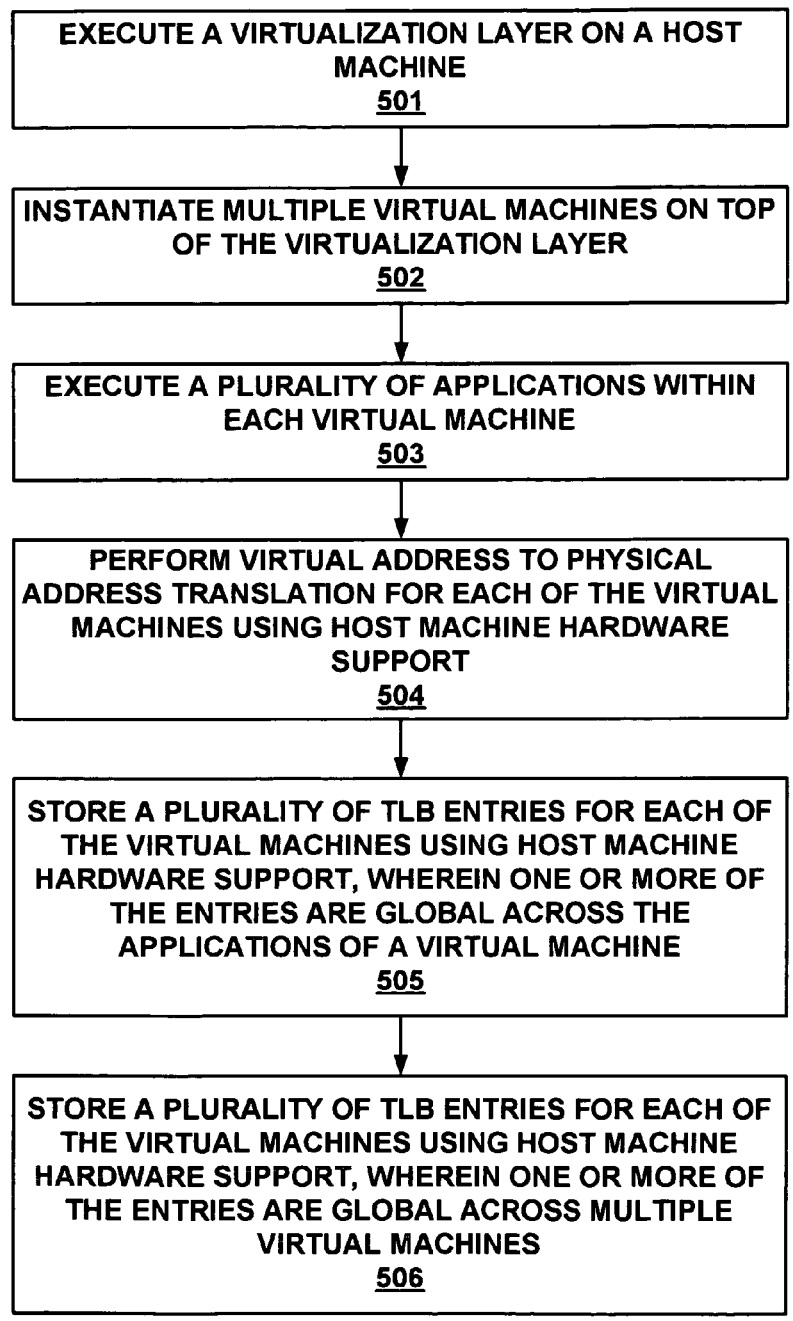
FIG. 5 shows a flowchart of the steps of an exemplary TLB-based process in accordance with one embodiment of the present invention.
Figure 6:
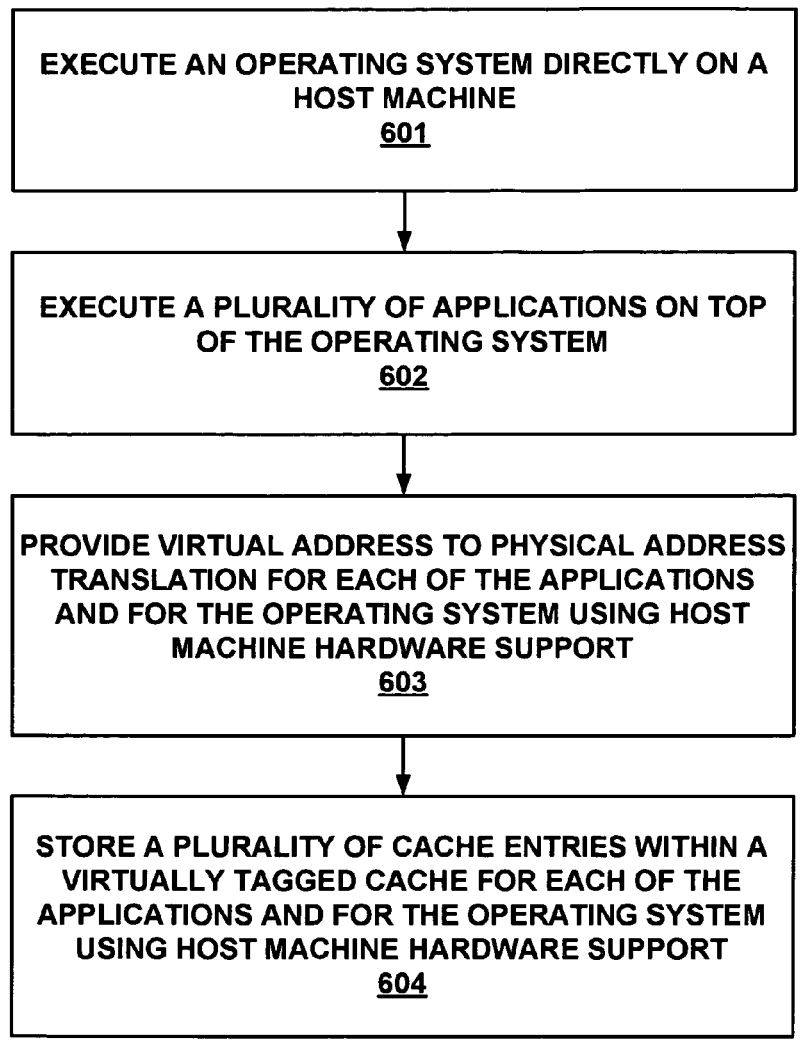
FIG. 6 shows a flowchart of the steps of an exemplary virtually tagged cache-based process in accordance with one embodiment of the present invention.

Referring now to FIG. 5 and FIG. 6, FIG. 5 shows a flowchart of the operating steps of a TLB-based virtual machine instantiation and support process 500 as implemented on a computer system platform (e.g., system 400 of FIG. 4), and FIG. 6 shows a flowchart of the operating steps of a virtually tagged cache-based process 600 supporting a plurality of applications executing upon a common operating system in accordance with one embodiment of the present invention.

As depicted in FIG. 5, process 500 begins in step 501, where a virtualization layer, or hypervisor 140, is executed on the host machine. In step 502, multiple virtual machines (e.g., virtual machines 101 and 102) are instantiated on top of the virtualization layer. In step 503, a plurality of applications are executed within each virtual machine (e.g., applications 125 and 126). In step 504, virtual address to physical address translation is performed for each of the virtual machines using host machine hardware support. In step 505, a plurality of TLB entries for each of the virtual machines are stored using the host machine hardware support (e.g., the host machine TLB). One or more of these entries are marked as global across the applications of one of the virtual machines. As described above, embodiments of the present invention can support global access to a TLB entry by all applications of one of the virtual machines. In step 506, a plurality of TLB entries for each of the virtual machines are stored using host machine hardware support, wherein one or more of the entries are global across multiple virtual machines. As described above, embodiments of the present invention can support global access to TLB entries across all virtual machines, and thus all virtual machine operating systems/applications.

As depicted in FIG. 6, process 600 begins in step 601, where an operating system (e.g., operating system 131) executes directly on a host machine (e.g., directly on the bare metal host machine 150). In step 602, a plurality of applications (e.g., applications 135-136) are executed on top of the operating system. In step 603, virtual address to physical address translation is provided for each of the applications and for the operating system using host machine hardware support. In step 604, a plurality of cache entries are stored for each of the applications and for the operating system using host machine hardware support. One or more of these entries are tagged such that they are global across the applications and across the operating system and one or more of these entries are tagged such that they are local, specific to one of the applications. Thus, embodiments of the present invention can support global access to a virtually tagged cache entry by all applications and can support local access to virtually tagged cache entry by a single application. Similarly, virtually tagged cache entries can be globally invalidated or can be invalidated on a local scale.

Figure 7:
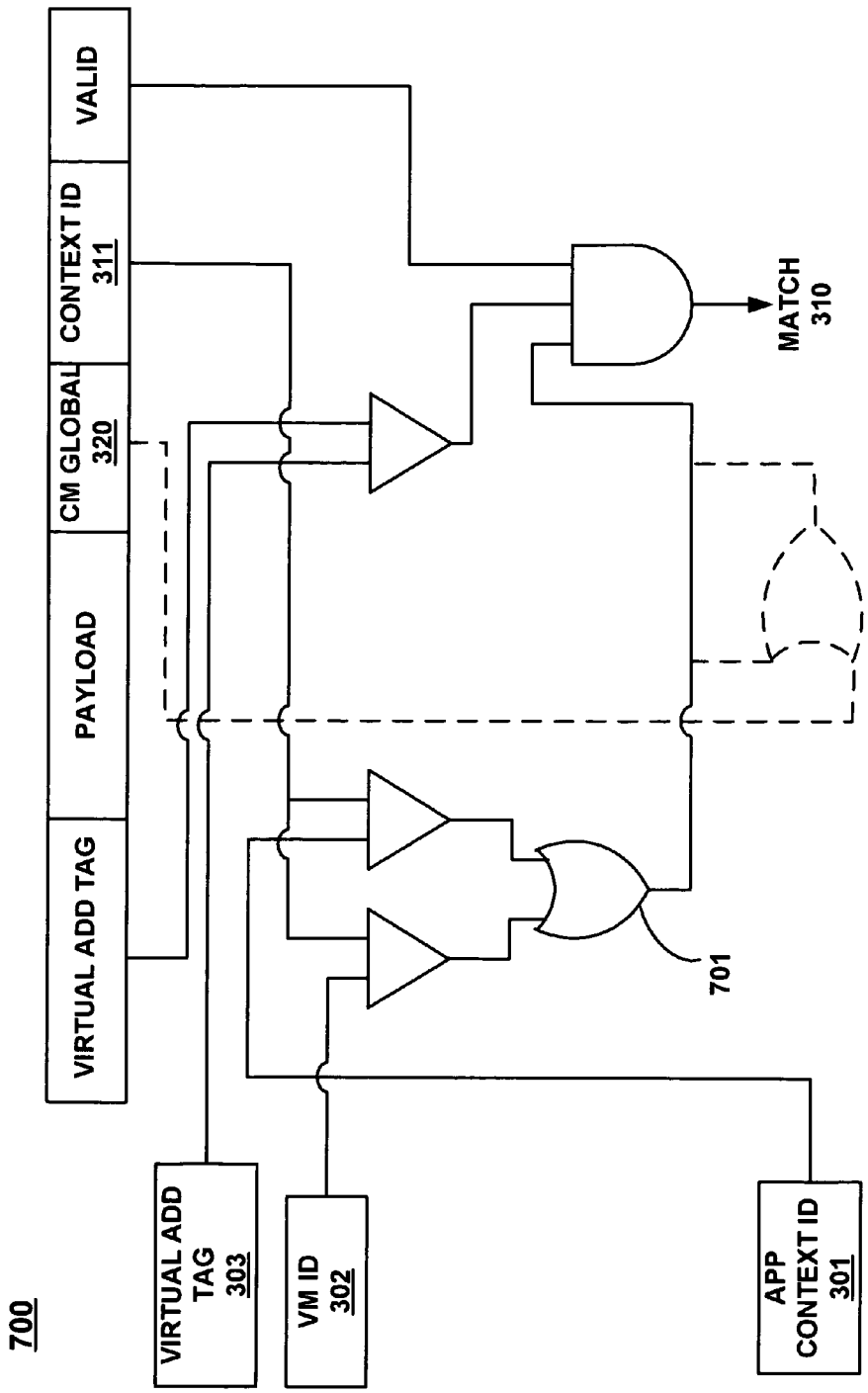
FIG. 7 shows a diagram depicting TLB or cache matching hardware in accordance with one embodiment of the present invention.

FIG. 7 shows a diagram depicting TLB or cache matching hardware 700 in accordance with one embodiment of the present invention. As depicted in FIG. 7, the hardware 700 is substantially similar to the hardware 300 described above in the discussion of FIG. 3. However, the hardware 700 embodiment utilizes an OR gate 701 to logically combine the comparator results of the virtual machine ID 302, the application context ID 301, and the context ID 311 as shown.

The hardware 700 embodiment utilizes the OR gate 701 as shown, and also deletes the use of the global bit (e.g., shown in FIG. 3). In the hardware 700 embodiment, virtual address tags can be invalidated on either a local scale or a global scale, even though the global bit is removed. This results in a significant simplification of the constituent logic while still providing the same functionality as the hardware 300 embodiment of FIG. 3.

The hardware 700 embodiment functions through the use of a management process that allocates space for the virtual machine IDs 302 and the context IDs 301 in such a manner that they do not overlap. For example, in a case where a total of "N" bits comprise both the virtual machine ID 302 and the context ID 301, the N bits define a numerical range of $2^N$ (e.g., integers 0 through $2^N$), and the management process can allocate up to $2^N$ entries, either global or local, such that they do not overlap.

Thus in an exemplary case where a total of 8 bits comprise both the virtual machine ID 302 and the context ID 301, the 8-bit range defines $2^8$ integers (e.g., 0 through 127). This range of integers, or a range of numbers, is tracked such that those numbers that are allocated for local identification entries (e.g., for local machine IDs) are tracked and those numbers that are allocated for global identification entries (e.g., for global processes) are tracked. Continuing the above example, in one embodiment, the range of numbers can be tracked such that some portion of the range (e.g., the numbers 0 through 200) are for local IDs and a remaining portion of the range (e.g., the numbers 201 through 255) are for global IDs, or the like.

It should be noted that the local IDs and the global IDs do not need to be allocated in the same proportion. For example, if a larger proportion of local IDs are needed in comparison to global IDs, the $2^N$ range can be allocated such a larger proportion of local IDs are allocated in comparison to global IDs.

In one embodiment, a separate data structure (e.g., table, etc.) can be maintained to keep track of which numbers of the range are global IDs and which numbers are local IDs. In such an embodiment, global IDs and local IDs can be allocated dynamically as needed by an application, operating system, virtual machine, or the like. The separate data structure would keep track of the IDs as they are allocated.

In one embodiment, the allocation of the $2^N$ range between local IDs and global IDs can be changed dynamically depending upon the changing needs of a given application (e.g., on-the-fly). This process will work so long as local IDs and/or global IDs are not reused (e.g., wrapped around). Management of the allocation process can be handled by software, microcode executing on the CPU, or by hardware logic. In one embodiment, the dynamic allocation is performed by a hypervisor as it executes on the host machine.

Figure 8:
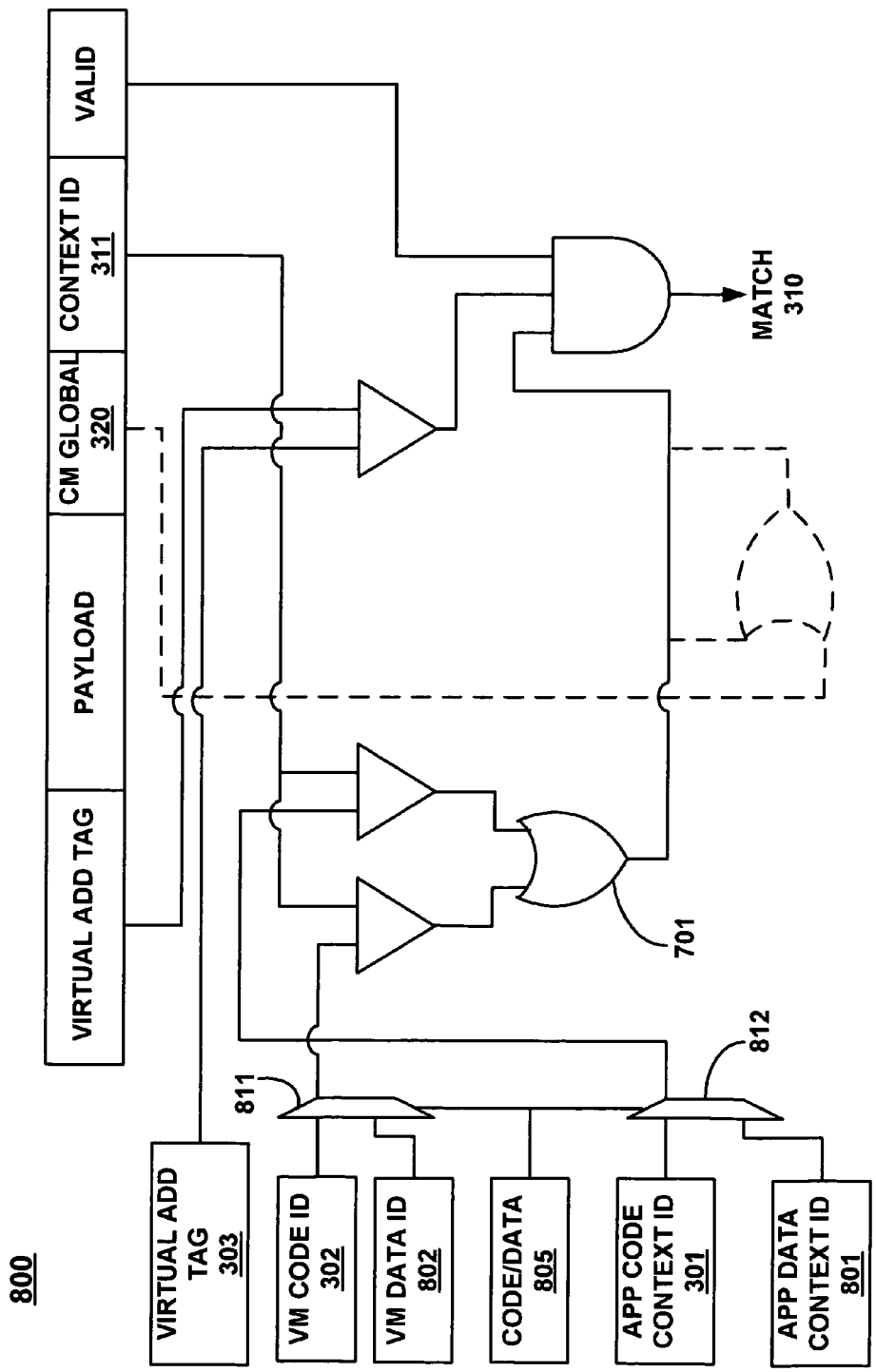
FIG. 8 shows a diagram depicting TLB or cache matching hardware in accordance with one embodiment of the present invention.

FIG. 8 shows a diagram depicting TLB or cache matching hardware 800 in accordance with one embodiment of the present invention. As depicted FIG. 8, the hardware 800 is substantially similar to the hardware 700 described above in the discussion of FIG. 7. However, the hardware 800 embodiment utilizes a code/data signal 805 to control multiplexers 811-812 to switch between code accesses and data accesses to the TLB or cache.

Some machine architectures use different virtual address to physical address translations for code versus data. In such machines, virtual machine IDs and context IDs can be tracked with respect to both code and data. In the present embodiment, multiplexers 811-812 are used to select between code and data references.

In general, embodiments of the present invention can implement "X" number of choices for each of VM ID and App context ID, were each choice represents, for example, different translation domains. In the FIG. 8 embodiment, there are two choices, one for code and one for data. The selection as to whether a references is for code or data is made earlier in the machine pipeline and is implement using the code/data signal 805 as shown. Thus, upon determination whether a TLB or cache access is for a code or a data reference, the signal 805 configures the multiplexers 811 and 812 accordingly to select, for example, the virtual machine ID 302 and the context ID 301 for a code access, or the virtual machine ID 802 and the context ID 801 for a data access. In other respects, the hardware 800 embodiment functions substantially the same as the hardware 700 embodiment described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
  storing a selecting value, a first context ID, and a second context ID in at least one cache entry of cache entries in a virtually tagged cache;
  storing a virtual address tag in the cache entries; and
  searching the virtually tagged cache, wherein said searching comprises:
    comparing a first context ID of a cache entry with a first provided context ID and generating a first match signal;

comparing a second context ID of the cache entry with a second provided context ID and generating a second match signal;
selecting a match signal from the first match signal and the second match signal based on the selecting value of the cache entry;
comparing the virtual address tag of the cache entry with a provided virtual address tag; and
generating a third match signal.

2. The method of claim 1, wherein said searching further comprises:
performing a logical operation with the match signal, the third match signal, and a valid bit of the cache entry; and
generating an output match signal.

3. A method comprising:
storing a first context ID and a second context ID in at least one cache entry of cache entries in a virtually tagged cache;
storing a virtual address tag in the cache entries; and
searching the virtually tagged cache, wherein said searching comprises:
comparing a first context ID of a cache entry with a first provided context ID and generating a first match signal;
comparing a second context ID of the cache entry with a second provided context ID and generating a second match signal;
setting a match signal to a match state if at least one of the first match signal or the second match signal indicates a match;
comparing the virtual address tag of the cache entry with a provided virtual address tag; and
generating a third match signal.

4. The method of claim 3, wherein said searching further comprises:
performing a logical operation with the match signal, the third match signal, and a valid bit of the cache entry; and
generating an output match signal.

5. A method comprising:
storing a first context ID and a second context ID in at least one entry of entries in a translation lookaside buffer (TLB);
storing a virtual address tag in the entries; and
searching the TLB, wherein said searching comprises:
comparing a first context ID of an entry with a first provided context ID and generating a first match signal;
comparing a second context ID of the entry with a second provided context ID and generating a second match signal;
setting a match signal to a match state if at least one of the first match signal or the second match signal indicates a match;
comparing the virtual address tag of the entry with a provided virtual address tag; and
generating a third match signal.

6. The method of claim 5, wherein said searching further comprises:
using a signal to select the first provided context ID and the second provided context ID from a plurality of context ID registers.

7. The method of claim 6, wherein at least one of the plurality of context ID registers stores a data context.

8. The method of claim 6, wherein at least one of the plurality of context ID registers stores a code context.

9. The method of claim 5, wherein said searching further comprises:
performing a logical operation with the match signal, the third match signal, and a valid bit of the entry; and
generating an output match signal.

10. A circuit comprising:
a first comparator operable to compare a first context ID of a cache entry with a first provided context ID and operable to output a first match signal;
a second comparator operable to compare a second context ID of the cache entry with a second provided context ID and operable to output a second match signal;
a third comparator operable to compare a virtual address tag of the cache entry with a provided virtual address tag and operable to output a third match signal;
a multiplexer operable to receive the first and second match signals and operable to output a match signal dependent on a selecting value of the cache entry; and
an AND gate operable to receive the match signal, the third match signal, and a valid bit of the cache entry and operable to generate an output match signal.

11. A circuit comprising:
a first comparator configured to compare a first context ID of a cache entry with a first provided context ID and configured to output a first match signal;
a second comparator configured to compare a second context ID of the cache entry with a second provided context ID and configured to output a second match signal;
an OR gate configured to receive the first and second match signals and configured to output a match signal;
a first multiplexer configured to receive outputs from a first plurality of registers and configured to output the first provided context ID in response to a signal; and
a second multiplexer configured to receive outputs from a second plurality of registers and configured to output the second provided context ID in response the signal.

12. The circuit of claim 11 further comprising:
a third comparator configured to compare a virtual address tag of the cache entry with a provided virtual address tag and configured to output a third match signal.

13. The circuit of claim 12 further comprising:
an AND gate configured to receive the match signal, the third match signal, and a valid bit of the cache entry and configured to generate an output match signal.

* * * * *